(12) United States Patent
Bliven et al.

(10) Patent No.: US 6,973,112 B2
(45) Date of Patent: Dec. 6, 2005

(54) PASSIVE GAS FLOW MANAGEMENT AND FILTRATION DEVICE FOR USE IN AN EXCIMER OR TRANSVERSE DISCHARGE LASER

(75) Inventors: Brian Bliven, San Jose, CA (US); David Turnquist, Morgan Hill, CA (US)

(73) Assignee: Visx, Incorporated, Santa Clara, CA (US)

( * ) Notice: Subject to any disclaimer, the term of this patent is extended or adjusted under 35 U.S.C. 154(b) by 71 days.

(21) Appl. No.: 10/632,686

(22) Filed: Jul. 31, 2003

(65) Prior Publication Data

US 2005/0025208 A1 Feb. 3, 2005

(51) Int. Cl.[7] .............................................. H01S 3/22
(52) U.S. Cl. ........................ 372/58; 372/55; 372/59; 372/98
(58) Field of Search ............................. 372/55, 57, 78, 372/58, 98

(56) References Cited

U.S. PATENT DOCUMENTS

| | | | |
|---|---|---|---|
| 3,889,209 A | | 6/1975 | Lavarini |
| 4,470,701 A | * | 9/1984 | Smith .......................... 356/467 |
| 4,856,007 A | | 8/1989 | Weiss |
| 5,018,162 A | | 5/1991 | Akins et al. |
| 5,027,366 A | | 6/1991 | Akins et al. |
| 5,197,078 A | | 3/1993 | Terada et al. |
| 5,359,620 A | | 10/1994 | Akins |
| 5,729,564 A | * | 3/1998 | Cullumber .................... 372/58 |
| 5,978,405 A | * | 11/1999 | Juhasz et al. .................. 372/57 |
| 6,001,251 A | | 12/1999 | Asher et al. |
| 6,151,350 A | | 11/2000 | Komori et al. |
| 6,395,073 B1 | | 5/2002 | Dauber |
| 6,450,641 B2 | * | 9/2002 | D'Souza et al. ............ 351/212 |
| 2003/0004500 A1 | | 1/2003 | Clapham et al. |
| 2003/0012245 A1 | * | 1/2003 | Bor .............................. 372/55 |

OTHER PUBLICATIONS

ERG Materials and Aerospace Corporation Nov. 13, 2002, p. 1-3.*
ERG Materials and Aerospace Corporation website entitled: "DUOCEL Foam Metal for Semiconductor Applications" at http://ergaerospace.com/semi.htm, printed Nov. 13, 2002.

* cited by examiner

Primary Examiner—Minsun Oh Harvey
Assistant Examiner—Dung(Michael) T. Nguyen
(74) Attorney, Agent, or Firm—Townsend & Townsend & Crew LLP; Mark D. Barrish

(57) ABSTRACT

The present invention provides systems and methods for filtering particles and assisting gas flow management within laser systems. In one embodiment, a laser apparatus (100) includes an elongate laser chamber defining a chamber cavity (130) and an electrode structure (140) disposed therein. The electrode structure includes an anode (148) spaced apart from a cathode (146). The laser includes an elongate baffle (174) disposed in the laser chamber. The baffle is adapted to arrest a plurality of particles generated within the chamber. In this manner, the baffle operates as a passive filtration system to help filter particles generated within the chamber during laser operation, and may further provide gas flow management capabilities.

32 Claims, 10 Drawing Sheets

PASSIVE GAS FLOW MANAGEMENT AND FILTRATION DEVICE FOR USE IN AN EXCIMER OR TRANSVERSE DISCHARGE LASER

BACKGROUND OF THE INVENTION

The present invention relates generally to laser systems, and more specifically, to systems and methods for filtering particles and assisting gas flow management within laser systems.

Gas discharge lasers are generally known in the art wherein a lasing gas is excited by an electrical power source to generate a relatively coherent discharge of light. In a typical configuration, the lasing gas is contained within a substantially closed vessel or housing having a laser discharge zone defined therein between a pair of main laser electrodes. The lasing gas is excited by applying a relatively large voltage, resulting in the generation of light which can be directed and focused through appropriate optic elements to provide a narrow and coherent beam. The laser is normally operated or fired in a pulsed manner by connecting a main electrode circuit to the electrical power source at a selected operating frequency. A circulation fan is commonly provided within the laser housing for flow-through circulation of the lasing gas through the laser discharge zone.

During laser operation, dust particles are generated within the laser housing each time the laser is fired, particularly in an excimer or transverse discharge laser. These dust particles are produced by a combination of erosion of metal components such as the main electrodes and/or associated pre-ionization pins in the vicinity of the laser discharge zone, and chemical conversion by the lasing gas. Over time, the generated dust particles coat the surfaces of internal laser components and can interfere with proper laser operation. Moreover, the dust particles can accumulate on the optic elements, resulting in potentially significant reduction in the power of the light beam discharged from the laser housing.

A variety of dust particle collection and/or filtration systems have been proposed in an effort to reduce the impact of dust particle generation on laser operation. Such systems having included, for example, external filtration devices and related gas circulation systems for mechanical filtration and/or electrostatic precipitation to remove dust particles from the lasing gas, followed by filtered gas delivery to the laser optics and housing. Such systems, however, are relatively complex with respect to the assembly of structural components and related circulation of the lasing gas to and from the laser housing. Moreover, external filtration devices, depending on the circulation velocities, can have a shearing effect on the lasing gas, thus heating the gas, an undesirable effect particularly in excimer or transverse discharge laser systems.

Accordingly, there exists a continuing need for further improvements in the collection and/or filtration of dust particles generated during operation of a gas discharge laser, particularly with respect to a compact and operationally efficient collection system adapted for mounting directly within the laser housing. The present invention meets these objectives and provides further advantages.

BRIEF SUMMARY OF THE INVENTION

The present invention relates generally to laser systems, and more specifically, to systems and methods for filtering particles and assisting gas flow management within laser systems. Systems and methods of the present invention will be particularly useful with transverse discharge lasers, such as excimer lasers, although are not limited to such systems.

In one embodiment, a laser apparatus of the present invention includes an elongate laser chamber and an electrode structure disposed within the chamber. The electrode structure includes an anode spaced apart from a cathode. The apparatus includes an elongate baffle disposed in the laser chamber. The baffle is adapted to arrest a plurality of particles generated within the chamber. In this manner, the baffle operates as a passive filtration system to help filter particles generated within the chamber during laser operation.

In some aspects, the baffle comprises an open-celled foam, and in a particular aspect, comprises an open-celled metal foam. The metal foam may be made from a variety of metals, including but not limited to nickel, aluminum, copper, brass, steel, alloys and the like. Some embodiments use Duocel brand open-celled metal foams commercially available from ERG Materials and Aerospace Corporation, based in Oakland, Calif. In another aspect, the baffle comprises an open-celled ceramic, dielectric or the like.

In some aspects, the electrode structure includes a plurality of pre-ionization pins, with at least some of the plurality of particles being generated by the pre-ionization pins. The particles may consist of a wide range of materials, and in some cases include nickel or brass. This may occur, for example, when the pre-ionization pins are made from nickel or brass.

In some aspects, the laser chamber is devoid of an active filtration system. In this case, the elongate baffle operates as a passive filtration or particle accumulation system. Typically, the elongate baffle is adapted to at least partially fill the laser chamber, and in a particular embodiment, fills greater than one percent of the chamber. In one aspect, the elongate baffle is generally parallel to the electrode structure. Such a positioning may be useful, for example, for controlling the gas flow pattern within the chamber as well as for particle attenuation.

In a particular aspect, the laser apparatus further includes a first end baffle positioned adjacent a first end of the electrode structure, and a second end baffle positioned adjacent a second end of the electrode structure. The end baffles also may comprise an open-celled foam, such as a metal foam. The end baffles are adapted to control a gaseous flow pattern adjacent the first and second electrode structure ends, as well as provide particle filtration functions. In a further aspect, the laser apparatus includes an optics package disposed at an end of the laser chamber, with one or both of the end baffles adapted to help prevent the gaseous flow pattern from washing over the optics package. In this manner, the optics remain free or substantially free of particulate matter which may otherwise degrade laser performance.

In one aspect, the laser apparatus comprises an excimer laser, having a lasing gas disposed within the chamber. The apparatus may generate a photoablative laser beam, in one embodiment, suitable for removal of corneal tissue. In one aspect, the corneal tissue is removed to correct refraction. In another aspect, the laser generates a pulsed laser having a wavelength of about 193 nm. In this manner, apparatus of the present invention may be used for vision correction or enhancement procedures.

In another embodiment of the present invention, a laser apparatus includes a casing defining a laser chamber, and an electrode structure disposed within the laser chamber. The electrode structure again has first and second ends disposed adjacent corresponding first and second laser chamber ends.

The laser apparatus includes a gas circulation mechanism for circulating a gas within the laser chamber. A baffle system is disposed in the laser chamber. The baffle system is adapted for directing the gas towards the electrode structure and for providing a non-turbulent gas flow around the electrode structure ends. In this manner, efficient gas flow is achieved near the electrode structure ends. As a result, misfire problems or other discharge non-uniformities which may otherwise occur are reduced or eliminated.

The present invention further provides exemplary methods of filtering particulates from a gas in a laser apparatus. In one embodiment, a laser apparatus is provided having a chamber, an electrode structure, and a gas circulation system. The method includes inserting an open-celled baffle system into the laser chamber, and engaging the gas circulation system to circulate the gas within the laser chamber. The gas has a plurality of particles disposed therein, and at least some of these particles are arrested by the baffle system. In one aspect, the baffle system operates to smooth a gas flow pattern at the first and second electrode structure ends.

The summary provides only a general outline of the embodiments according to the present invention. Many other objects, features and advantages of the present invention will become more fully apparent from the following detailed description, the appended claims and the accompanying drawings.

DETAILED DESCRIPTION OF THE INVENTION

Figure 1:
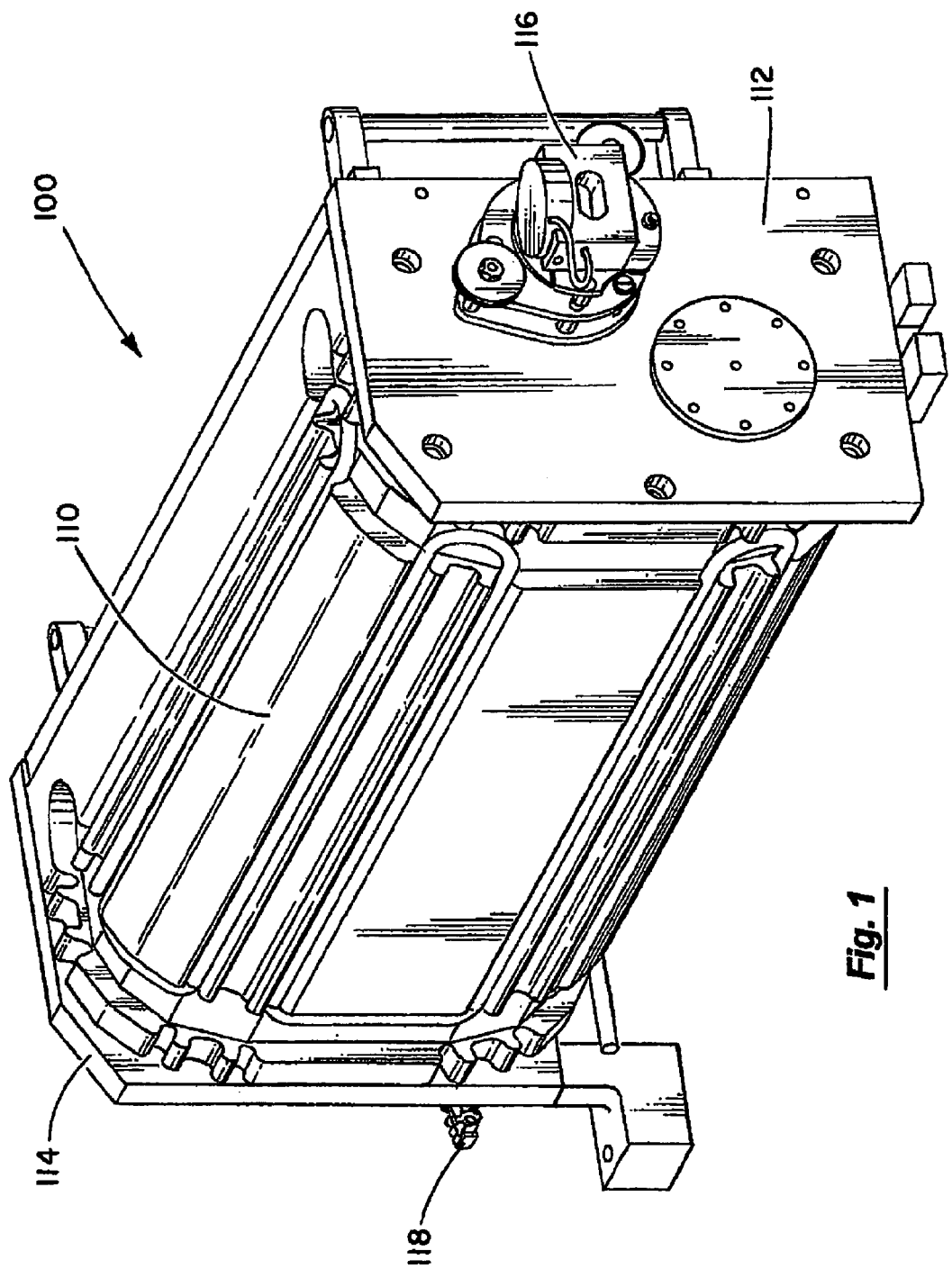
FIG. 1 is an overall view of a laser apparatus according to one embodiment of the present invention.

The present invention provides exemplary systems and methods for filtering particles and assisting gas flow management within laser systems. One embodiment of the present invention is depicted in FIG. 1, showing a laser apparatus 100 for use in a laser system. Laser apparatus 100 includes a casing 110 coupled to a first end plate 112 and a second end plate 114. Casing 110 and end plates 112, 114 help define a laser chamber gas containment cavity 130 within apparatus 100 (see FIG. 2). Laser apparatus 100 includes an optics package 116 and its associated mirror assembly 158 disposed at ends 112 and 114, respectively. Apparatus further includes a power connector 118 for coupling a laser fan motor 122 to an electrical power source.

Figure 2:
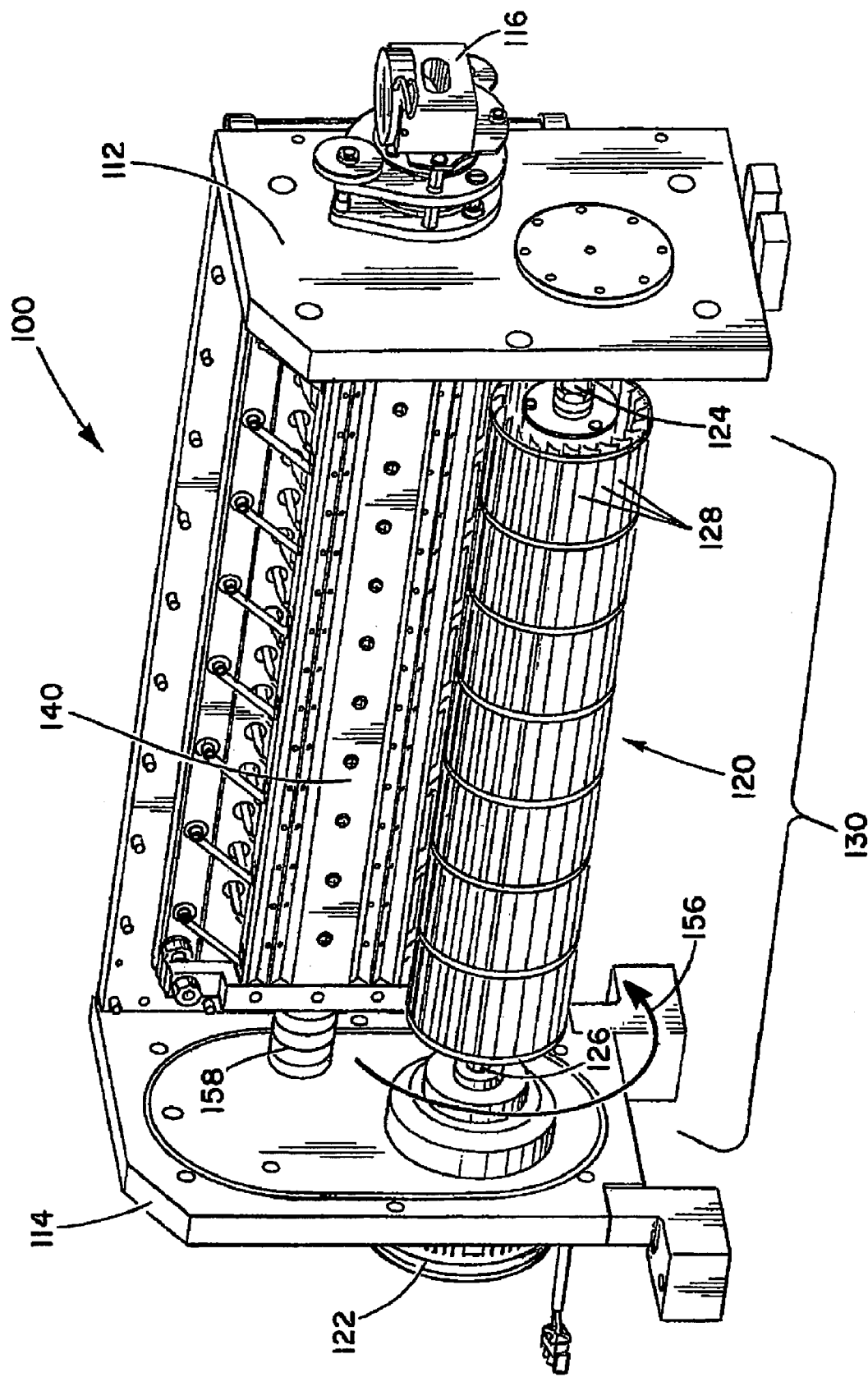
FIG. 2 is an overall view of the laser apparatus of FIG. 1 with a portion of the outer housing removed.

FIG. 2 depicts laser apparatus 100 without casing 110, thereby revealing a gas circulation device 120 and an electrode structure 140 enclosed within laser chamber cavity 130. In one embodiment, gas circulation device 120 is a rotary fan having a plurality of blades 128 disposed about a circumference of fan 120. Fan 120 is coupled between a first hinge or bearing point 124 and a second hinge point 126, disposed near or at first end plate 112 and near or at second end plate 114, respectively. Motor 122 operates to rotate fan 120, with the rotation of fan 120 causing the circulation of a gas within laser chamber cavity 130. The gas (not shown) may comprise a wide range of gases known to those skilled in the art, including rare gas halides. For example, the lasing gas may comprise fluorine, chlorine, krypton, argon, xenon, helium, neon, or the like. The transfer or circulation of gas within laser chamber cavity 130 is depicted by an arrow 156.

Circulation device 120 directs lasing gas within laser chamber cavity 130 to pass through electrode structure 140. In one embodiment, circulation device 120 directs the lasing gas in a direction generally between the electrodes of electrode structure 140. A voltage is applied across terminals of electrode structure 140 to create a light as is known to those skilled in the laser arts. The light is directed with the assistance of mirror assembly 158 disposed near second end 114, and optics package 116 disposed near end 112. The light is emitted from laser apparatus 100 via a window (not shown) in optics package 116. Additional details describing laser system operation are disclosed in Patent Application Publication US 2003/0004500, entitled Interface for Laser Eye Surgery, published Jan. 2, 2003 and assigned to the assignee of the present invention, the complete disclosure of which is incorporated herein by reference for all purposes.

Figure 3:
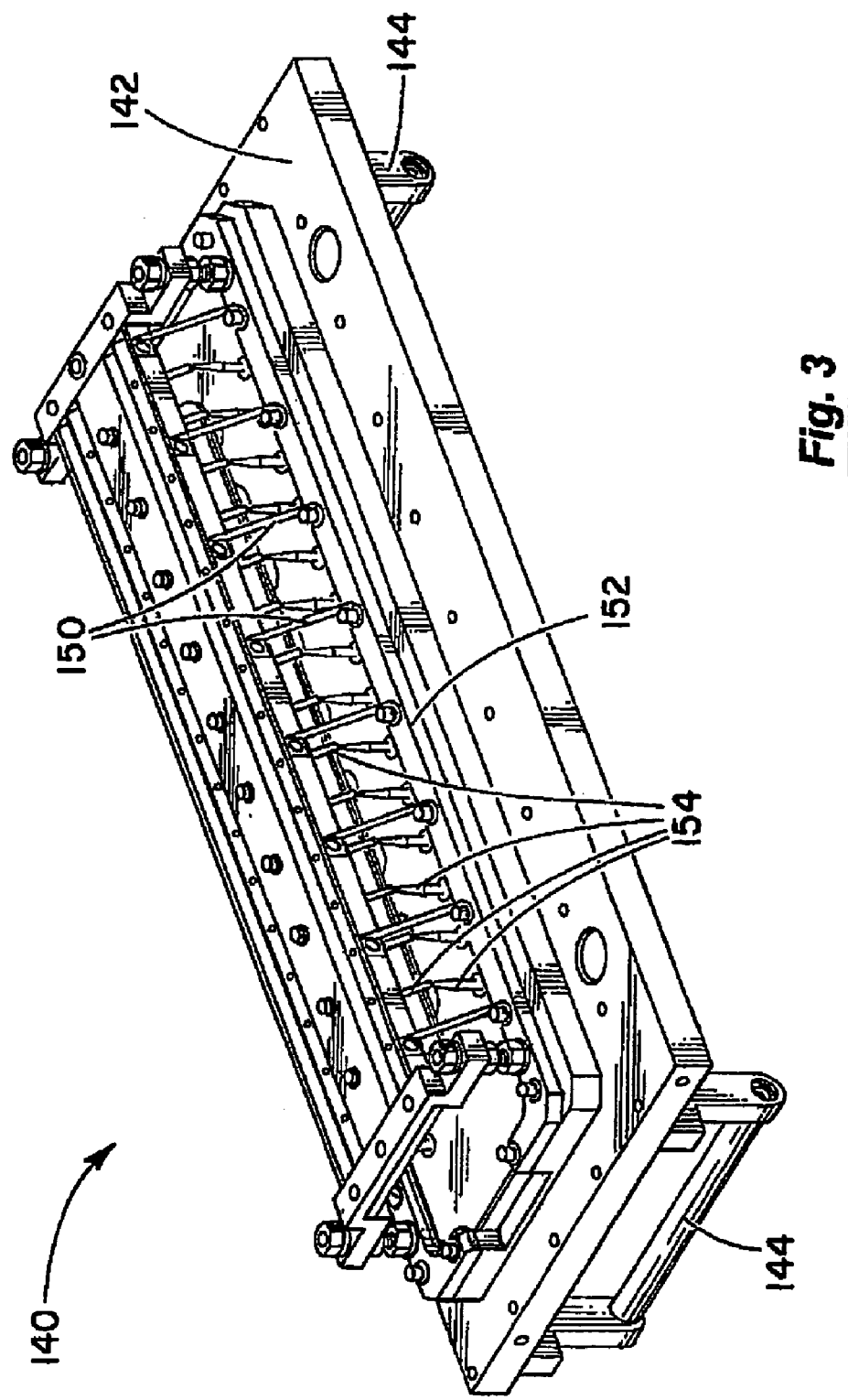
FIG. 3 is an overall view of an electrode structure for use with laser apparatus of the present invention.
Figure 4:
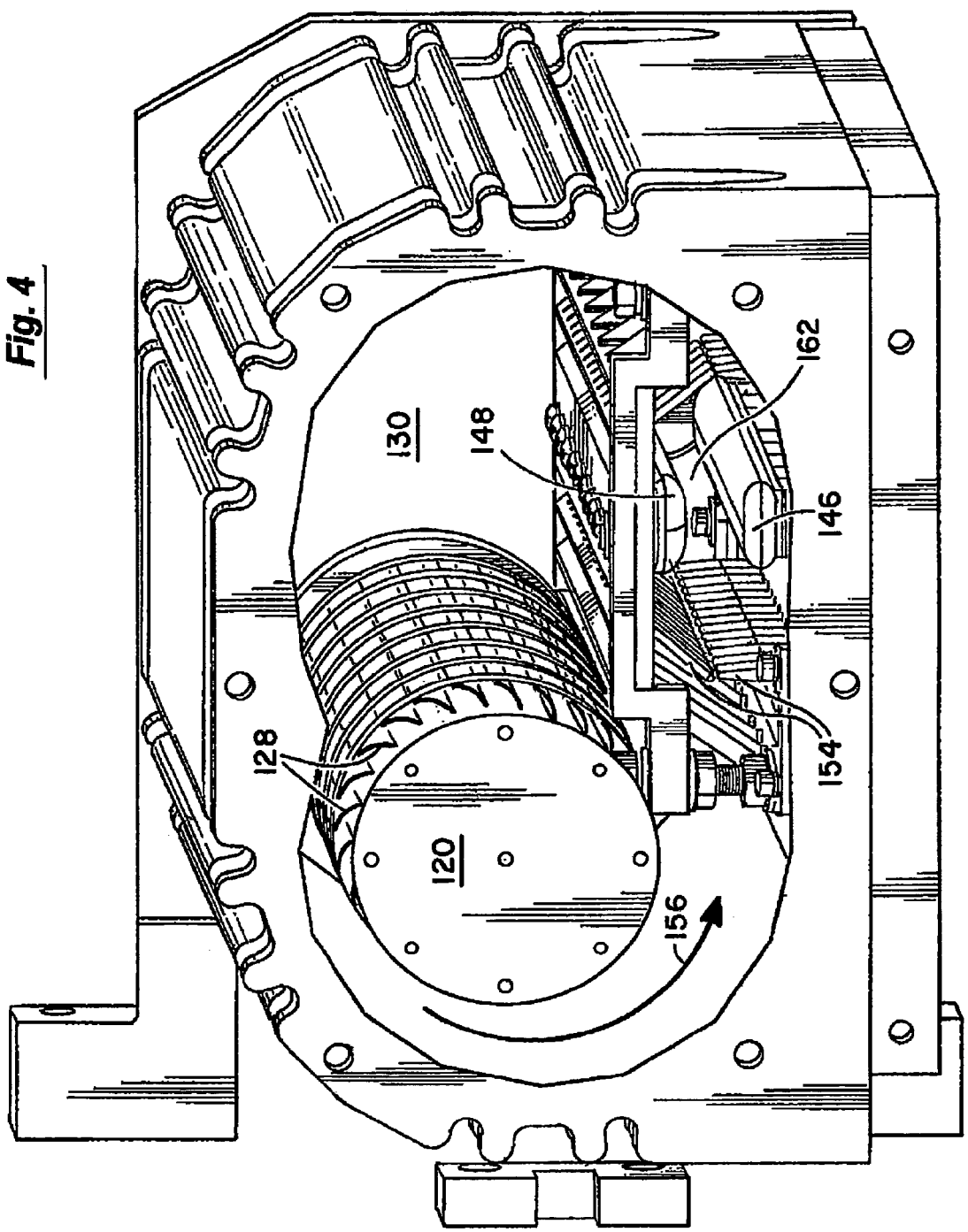
FIG. 4 is a front overall view depicting the interior of a laser chamber according to the present invention.

As shown in FIG. 3, electrode structure 140 is coupled to a base plate 142 having one or more handles 144 disposed on a surface thereof. In one embodiment, base plate 142 couples to casing 110 and/or end plates 112, 114 to define laser chamber cavity 130 within apparatus 100. In this manner, base plate 142 and electrode structure 140 can be removed from apparatus 100 to allow access to chamber cavity 130, to permit refurbishment of electrode structure 140, and the like. Base plate 142 has a mounting structure 152 coupled thereto by way of bolts, screws, or the like. Electrode structure 140 includes an anode 148 and a cathode 146 spaced apart to define a lasing region 162 therebetween as best seen in FIG. 4. Anode 148 and cathode 146 comprise the primary electrodes for applying a large voltage across the lasing gas passing through lasing region 162. Anode 148 is grounded to mounting structure 152 by way of a plurality of ground strips 150 as seen in FIG. 3.

Electrode structure 140 further includes a plurality of pre-ionization pins 154 as can be seen in both FIGS. 3 and 4. Pre-ionization pins are preferably aligned in pairs, with each pair of pins having a small gap therebetween. In one embodiment, the gap is on the order of about forty (40) hundredths of an inch (0.040 in), although the precise gap will depend upon the particular embodiment. In one embodiment, pre-ionization pins 154 comprise nickel, but may also comprise brass, copper, tungsten, precious metals, alloys or the like. Pre-ionization pins 154 create an arc in the lasing gas just before the high voltage pulse is applied between anode 148 and cathode 146. Such an arrangement helps provide for a smooth discharge of electrical energy producing the laser light.

Figure 5:
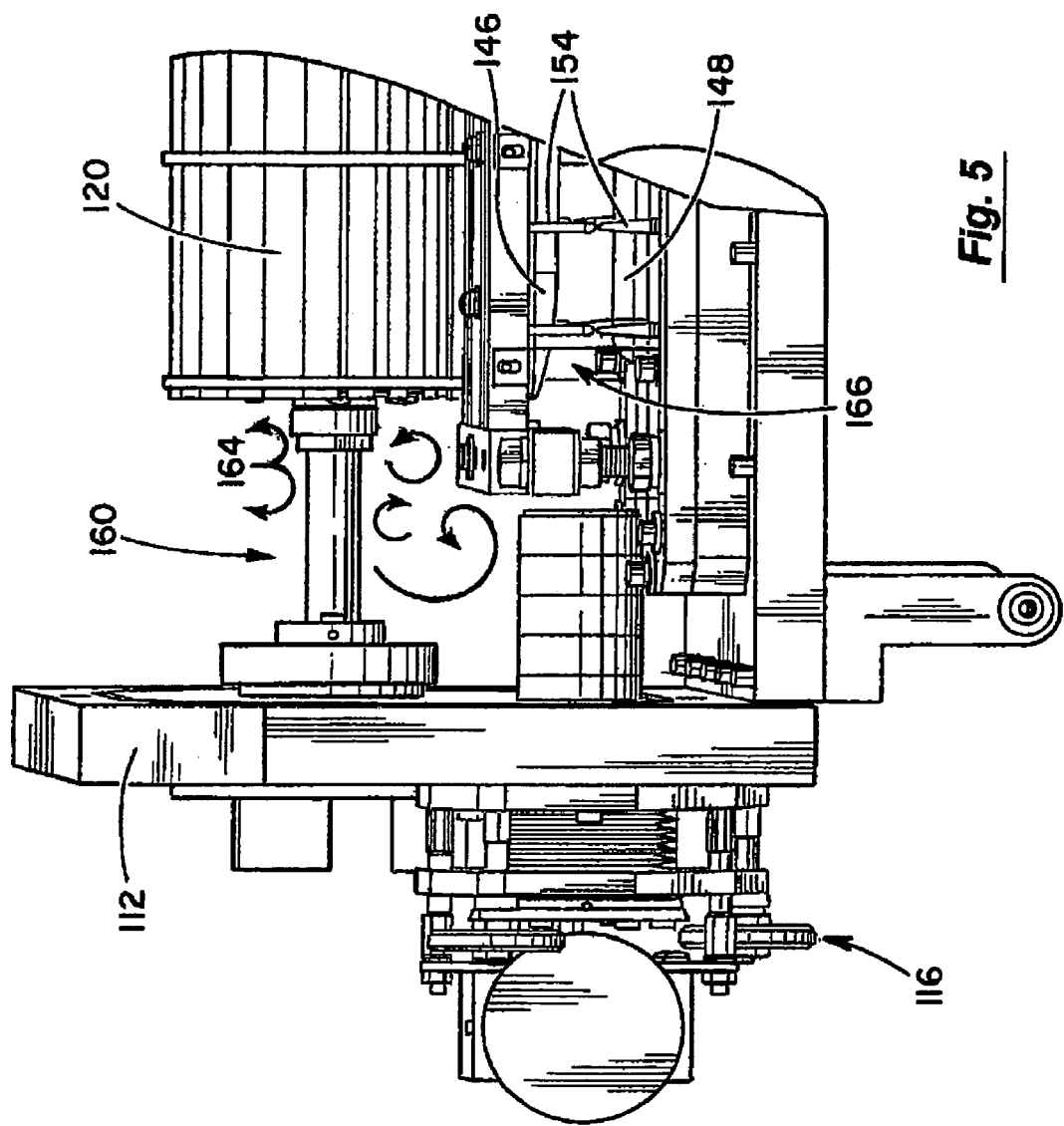
FIG. 5 is a top view showing an end of the laser chamber and an end of the electrode structure according to the present invention.

As shown in FIG. 5, a gap 160 exists between an end of fan 120 and first end plate 112. Prior to the present invention, operation of apparatus 100 resulted in a turbulent gas flow in gap 160, as depicted by arrows 164. The turbulent gas flow resulted in an unstable electric arc between anode 148 and cathode 146. This produced a misfire region 166 near the ends of anode 148 and cathode 146. As a result, the gas exchange was not clean and uniform, and the electric arc between anode 148 and cathode 146 was unstable. During a preliminary investigation of the problem, the inventors discovered that placing a plate-like structure in gap 160 resulted in a more laminar flow near the end of electrode structure 140. In particular, the misfiring in misfire region 166 was reduced or eliminated.

Figure 6:
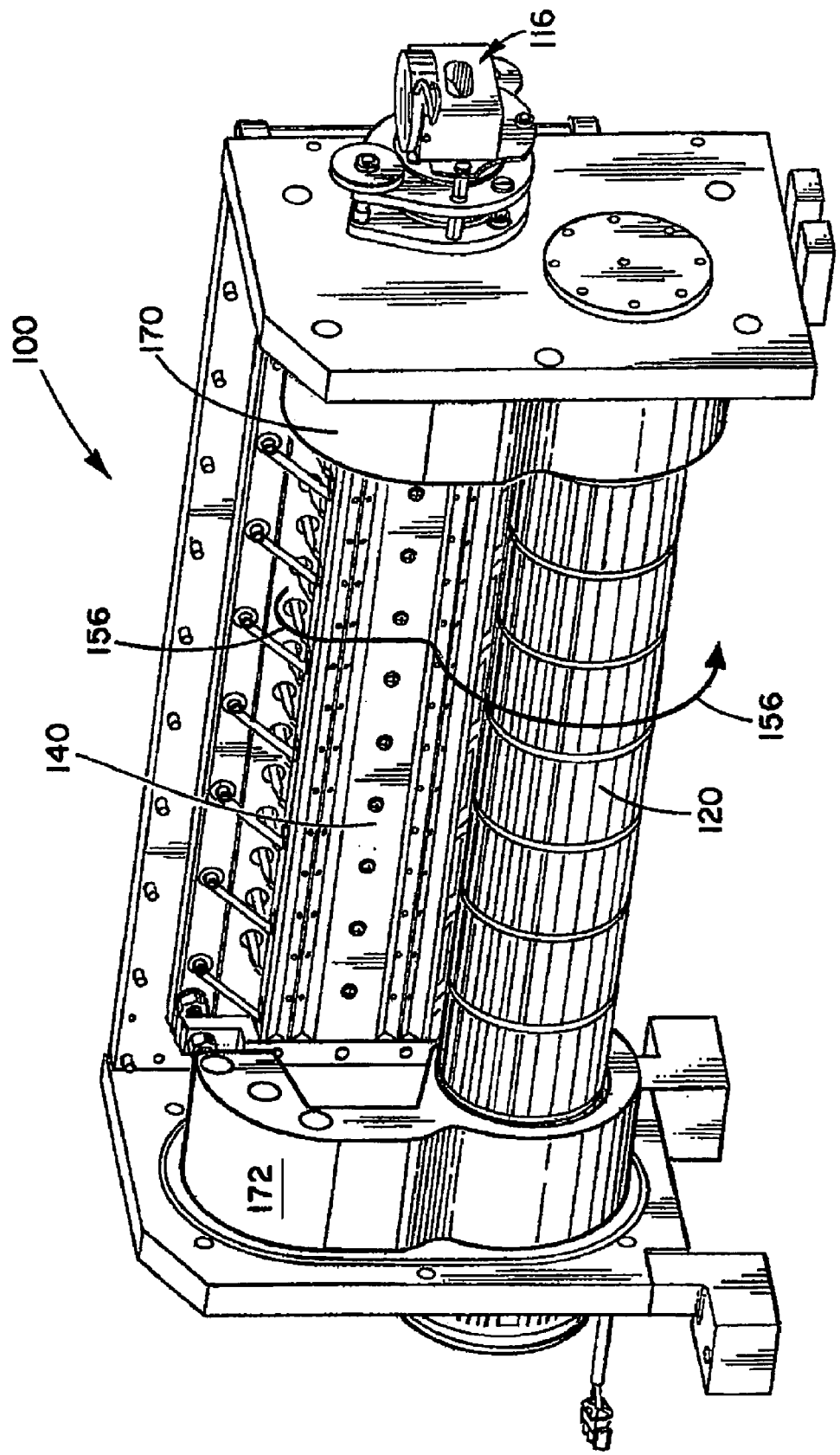
FIG. 6 is an overall view of a laser apparatus which includes first and second end baffles according to the present invention.
Figure 7:
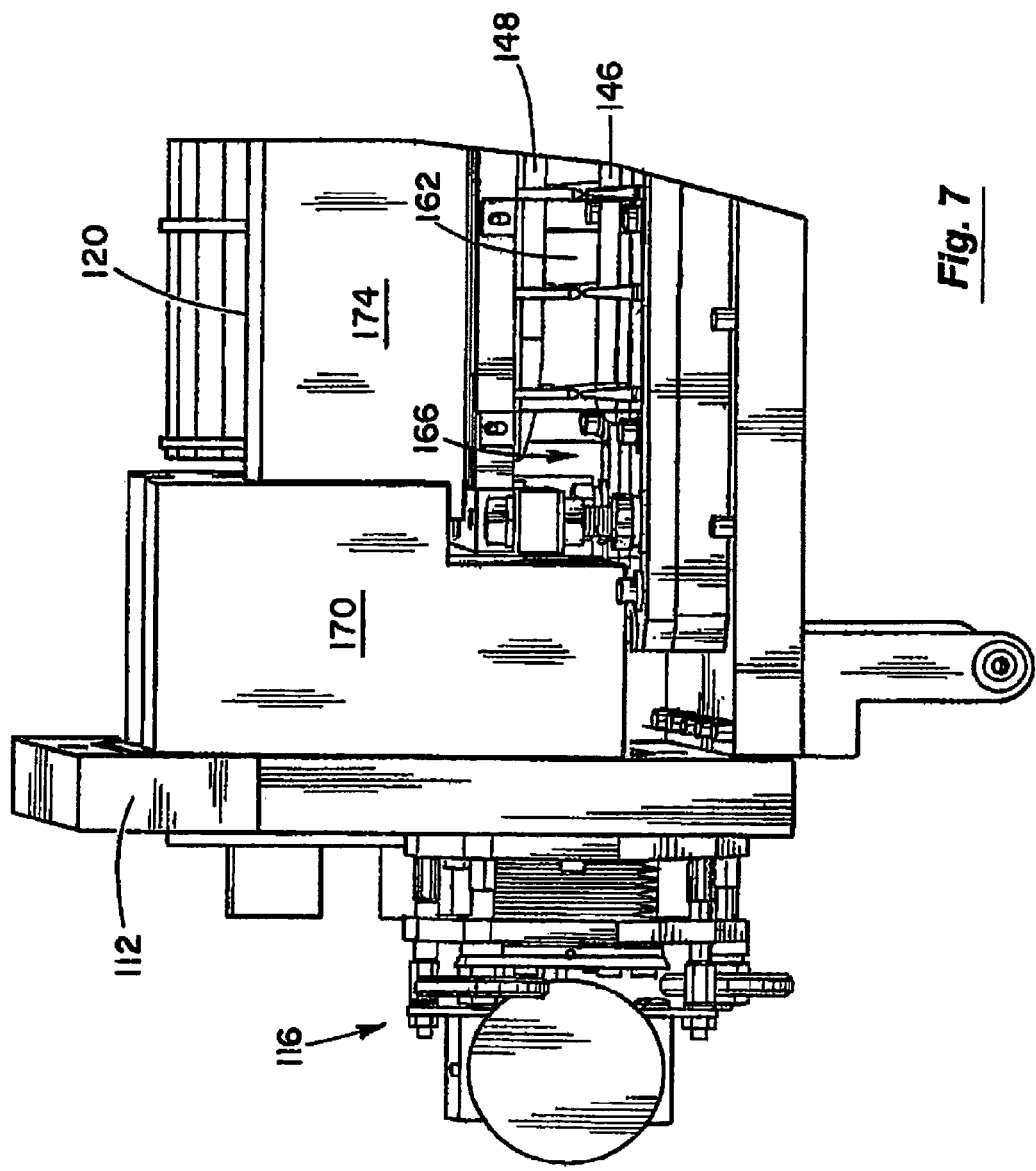
FIG. 7 is a top view of an end baffle and primary baffle positioned in the laser chamber.
Figure 8:
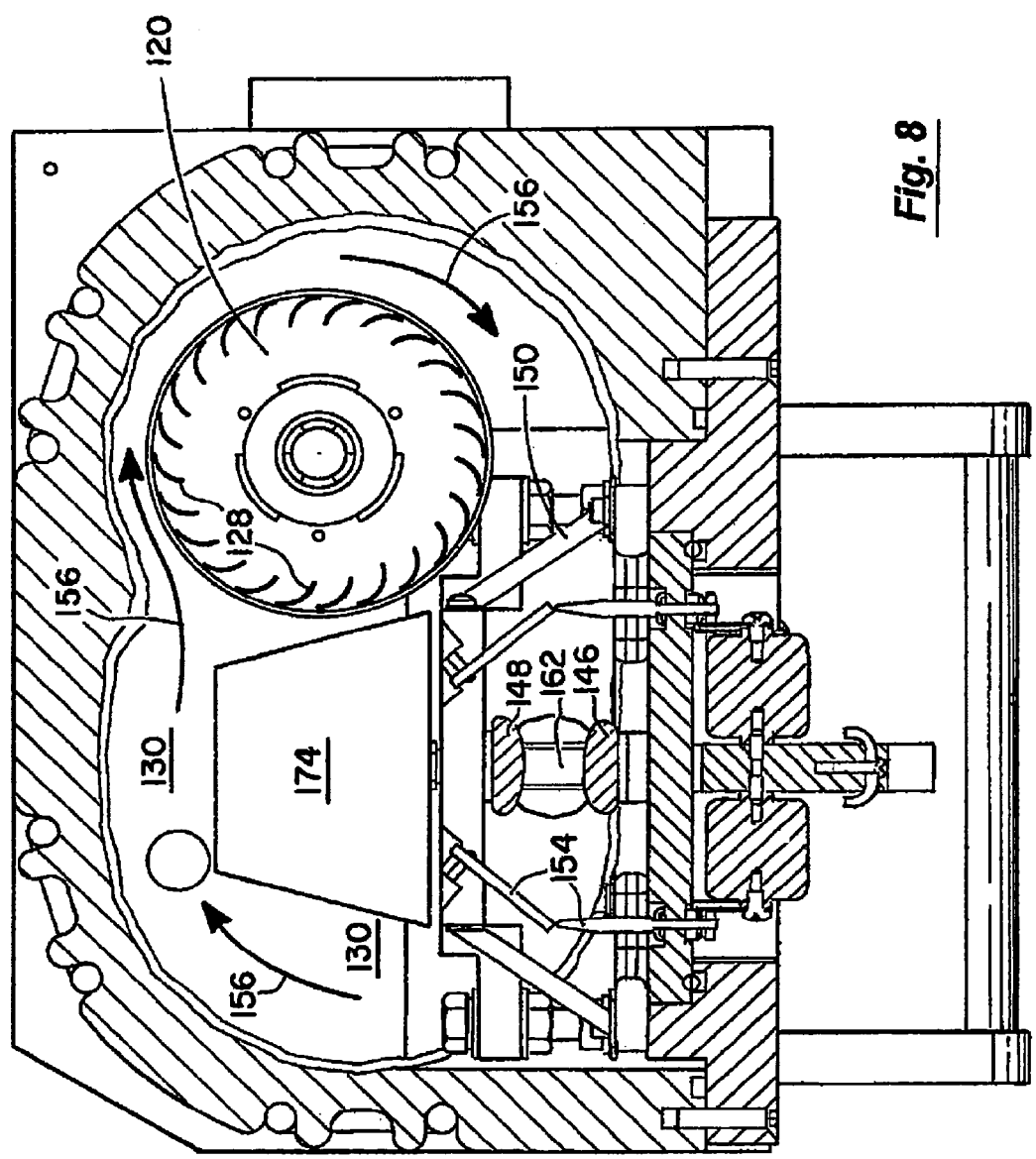
FIG. 8 is a mid-section view of a laser apparatus which includes a primary baffle according to the present invention.

In one embodiment of the present invention, improved gas flow characteristics are achieved near the ends of electrode structure 140 by inserting first and second end baffles 170, 172, in gaps 160. As best shown in FIG. 6, in one embodiment first end baffle 170 and second end baffle 172 comprise a structure for blocking flow in gaps 160. In another embodiment, end baffles 170, 172 comprise an open-celled foam structure for managing flow about the ends of electrode structure 140. In this manner, by filling or substantially filling gaps 160, unstable flow patterns near the ends of electrode structure 140 are reduced or eliminated. As a result, the gas exchange is more uniform, and the electric arc between anode 148 and cathode 146 is more stable. Improved laser 100 performance results.

In addition to assisting with gas flow management, the open-celled structure of end baffles 170, 172 provides a passive particle accumulation system as further described below. In one embodiment, the open-celled structure comprises ceramics or metals. In a particular embodiment, the open-celled structure of end baffles 170, 172 comprises an open-celled metal foam. In some embodiments, the open-celled foam is selected from aluminum, brass, copper, nickel, steel, precious metals, alloys or combinations of these metals, ceramics or other dielectrics, or the like.

The open cells can have a variety of shapes and configurations. In a particular embodiment, the open cells have a duodecahedronal cell structure, while in other embodiments the cells are irregular in shape. Such a material is machinable, and can be cut and compressed to desired shapes and densities, all within the scope of the present invention. In some embodiments, the openings or cells in baffles 170, 172 are random in shape and/or size. In a particular embodiment, the overall porosity of baffles 170 and 172 is generally uniform throughout the baffles. In this manner, the baffles are adapted to slow or stop gas flow in three dimensions. In one embodiment, baffles 170, 172 comprise continuous three-dimensional blocks or pieces of open-celled material.

The open-celled foam structure of first and second end baffles 170, 172, comprises a passive particle accumulation system. Operation of laser apparatus 110 produces a plurality of particles within chamber cavity 130. The particles, in some cases, originate from the interaction between the lasing gas and pre-ionization pins 154. For example, pre-ionization pins 154 comprising nickel and lasing gas comprising fluorine will produce nickel fluoride (NiF) particles in chamber cavity 130. These particles, if unfiltered, deposit on optics package 116, mirror assembly 158, and other interior surfaces of laser apparatus 100, degrading laser 100 operation. The particles also may cause erratic voltage breakdown and discharge formation, may produce trace paths between or near the electrodes causing misfire, and the like. Hence, baffle systems of the present invention provide a means for particles to be attenuated or be arrested within the cell structure of end baffles 170, 172. Such a baffle system provides an exemplary passive particle accumulation system offering numerous advantages over prior filtration devices.

For example, other systems may contain an active filtration device which draws some or all of the lasing gas from the laser chamber, passes it through a filter, and returns the filtered gas to the laser chamber. The device may have a separate blower or fan to draw gas out of the laser chamber, force it through a filter, and return the gas to the chamber. In other filter devices, the blower is coupled to the chamber circulation fan or runs off the same motor as the circulation fan, with the filter blower and chamber fan operating at identical or similar speeds. One problem with this arrangement is the fact that the filtration device blower may require operation at higher speeds than desired for the circulation fan. In such a case, the filtration device blower tends to shear the lasing gas as it passes through the filter and associated blower, which increases the gas temperature. The addition of heat to the lasing gas is undesirable, particularly in an excimer laser, which apparatus 100 is in one embodiment.

In contrast, the present invention has adopted a passive particle accumulation system. As a result, in one embodiment circulation fan 120 operates at an optimal rotational speed for the circulation of lasing gas in chamber cavity 130. For example, in one embodiment, circulation fan 120 rotates between about eight hundred revolutions per minute (800 RPMs) and about twenty-eight hundred (2800) RPMs, and in a specific embodiment is at about 1800 RPMs. In one embodiment, the passive particle accumulation system of the present invention obviates the need for an active particle filtration device. Benefits of such a passive system include, but are not limited to, lower laser 100 cost, improved laser gas quality and stability, a shorter laser chamber cavity 130, and other benefits.

Another advantage of the present invention involves the potential use of end baffles 170, 172, to provide protection for optics package 116. End baffles 170, 172 also may provide protection for mirror assembly 158 (see FIG. 2). As previously noted, systems having active gas filtration devices may wash the gas flow over the optics package within the laser chamber. This can be problematic for active filtration devices since the filter gradually accumulates particulate matter and, as a result, does not sufficiently filter particles from the passing lasing gas. The active filtration device return gas is reduced in flow back to chamber cavity 130 over the optics package. This reduced flow washing of the optics package allows largely unfiltered lasing gas within chamber cavity 130 to cloud or fog the optics package with particulate matter which is not displaced with clean gas. In one embodiment, end baffles 170, 172 help reduce particulate flow near the ends of chamber cavity 130, and may be used in conjunction with a gated baffle system. Additional details of a gated baffle system for reducing or eliminating optics washing are provided in U.S. Pat. No. 5,359,620; U.S. Pat. No. 5,027,366; and U.S. Pat. No. 5,018,162, the complete disclosures of which are incorporated herein by reference for all purposes.

In one embodiment of the present invention, end baffles 170, 172 operate to prevent or help prevent the lasing gas from washing across optics package 116. This occurs, for example, as a result of the placement of end baffles 170, 172 between the ends of the interior laser chamber and circulation fan 120. This arrangement benefits laser apparatus 100 having a passive filtration system. In other embodiments, this apparatus also would benefit laser systems having an active filtration device.

Further, open-celled end baffles 170 and 172 help attenuate or reduce acoustic energy within laser chamber cavity 130. Typical operation of apparatus 100 produces a popping noise from the pulsed firing of electrode structure 140. End baffles 170, 172 absorb some of this noise produced during laser 100 operation, resulting in a quieter laser 100.

Figure 9:
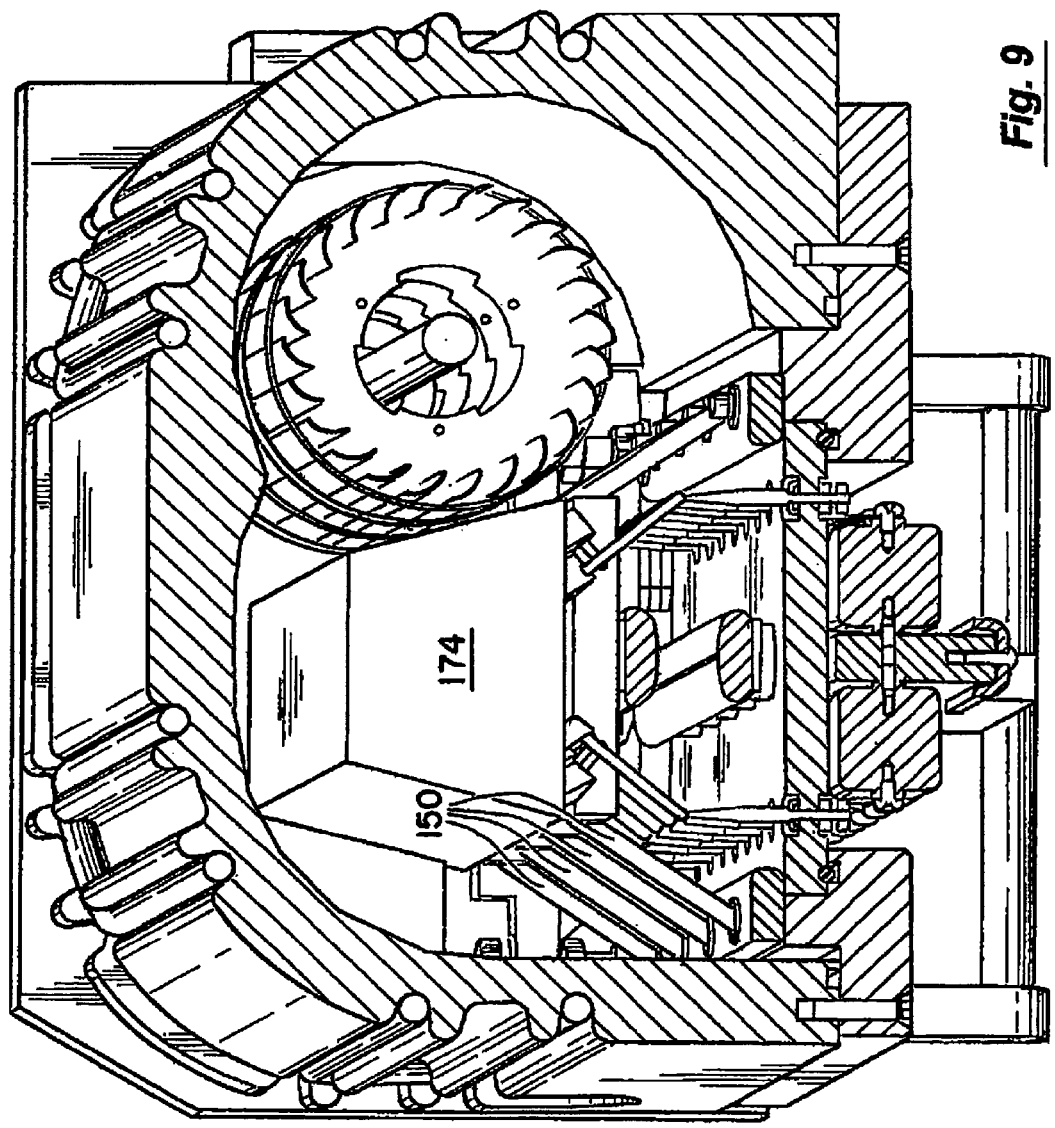
FIG. 9 is an iso-section view of the laser apparatus of FIG. 8.
Figure 10:
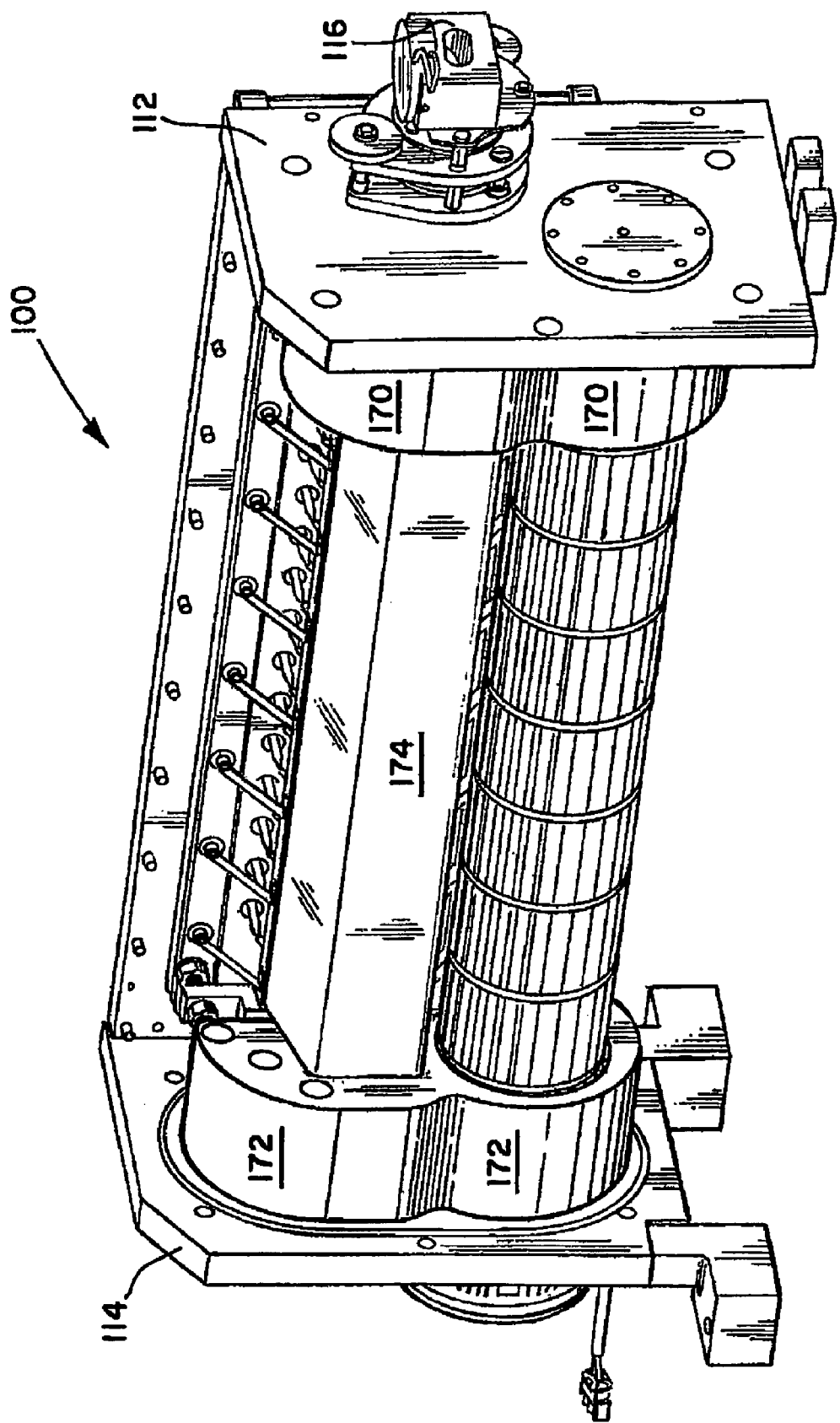
FIG. 10 is an overall view of a laser apparatus depicting a baffle system therein according to the present invention.

In another embodiment of the present invention as shown in FIGS. 7-10, apparatus 100 has a baffle system which includes a primary baffle 174. As best seen in FIG. 9, primary baffle 174 comprises an elongate baffle positioned adjacent circulation fan 120. Primary baffle 174 operates to further control the gas flow within chamber cavity 130 during rotation of fan 120. In a particular embodiment, primary baffle 174 is positioned to be generally parallel to circulation fan 120. In another embodiment, primary baffle 174 is disposed to be generally parallel to anode 148 and cathode 146. Primary baffle 174 provides further sound attenuating capability, further particulate accumulation capability, and further gas flow management characteristics according to the present invention. In one embodiment, primary baffle 174 comprises an open-celled baffle, and in a particular embodiment comprises an open-celled metal baffle comprised of aluminum, copper, nickel, brass, steel, precious metals, alloys or combinations thereof, or the like. Primary baffle 174 also may comprise open-celled ceramics, other dielectrics, or the like. The cell structure of primary baffle 174 may be similar to or the same as previously described for end baffles 170, 172.

It will be appreciated by those skilled in the art that various embodiments of the present invention may use baffle systems having different sizes and configurations. For example, in one embodiment the baffle system includes only primary baffle 174, without end baffles 170, 172. In such an embodiment, the primary baffle may occupy between about one percent (1%) and about sixty percent (60%) of laser chamber cavity 130 which would otherwise be empty absent the baffle system. In another embodiment, end baffles 170, 172 are used in conjunction with primary baffle 174. In this case, the end baffles 170, 172 and primary baffle 174 together fill between about two percent (2%) and about ninety percent (90%) of laser chamber cavity 130 that would otherwise be empty if apparatus 100 had no baffle system. Additionally, the baffle system may comprise only end baffles 170 and 172. In this case, end baffles 170, 172 operate to fill or substantially fill gaps 160, and together fill between about one percent (1%) and about eighty percent (80%) of laser chamber cavity 130 which would otherwise be empty. Other percentages of chamber fill also are possible within the scope of the present invention. Further, it should be noted that the percentages herein do not take into account the porous nature of baffles 170, 172 and 174. Instead, the percentages are based on the overall volume of the baffle(s) as calculated by the outer dimensions thereof.

Alternative embodiments also are included in the present invention which use only a single end baffle 170 or 172, either alone or in conjunction with primary baffle 174. For example, one embodiment entails having only end baffle 170 to protect or help protect optics package 116 from particulate matter in laser chamber cavity 130.

Before efficient laser 100 operation, the surfaces of all structures within laser chamber cavity 130 are passivated through an initial reaction process with the lasing gas. Prior devices typically avoided introducing large masses or large surface area into the laser chamber. The inventors discovered, however, that the addition of baffles 170, 172 and/or 174 did not significantly add to the passivation time. Further, in one embodiment, laser apparatus 100 does not include an active filtration system, which in some embodiments helps result in a smaller laser apparatus 100.

Notwithstanding the above description, it should be recognized that many other systems, functions, methods, and combinations thereof are possible in accordance with the present invention. Thus, although the invention is described with reference to specific embodiments and figures thereof, the embodiments and figures are merely illustrative, and not limiting of the invention. Rather, the scope of the invention is to be determined solely by the appended claims.

What is claimed is:

1. A laser apparatus, comprising:
   an elongate laser chamber;
   an electrode structure disposed within the chamber, the electrode structure comprising an anode spaced apart from a cathode; and
   an elongate baffle comprising an open-celled foam disposed in the laser chamber, the baffle adapted to arrest a plurality of particles generated within the chamber;
   wherein the elongate baffle is adapted to at least partially fill the laser chamber.

2. The laser apparatus as in claim 1 wherein the open-celled foam comprises an open-celled metal foam.

3. The laser apparatus as in claim 2 wherein the open-celled metal foam is selected from a group of metal foams consisting essentially of nickel, aluminum, brass, steel, and copper.

4. The laser apparatus as in claim 1 wherein the baffle comprises an open-celled ceramic.

5. The laser apparatus as in claim 1 wherein the electrode structure further comprises a plurality of pre-ionization pins, and wherein at least some of the plurality of particles are generated by the pre-ionization pins.

6. The laser apparatus as in claim 1 wherein at least some of the plurality of particles comprise a metal.

7. The laser apparatus as in claim 1 wherein the laser chamber comprises an excimer laser.

8. The laser apparatus as in claim 1 wherein the laser chamber is devoid of an active filtration system.

9. The laser apparatus as in claim 1 wherein the elongate baffle is generally parallel to the electrode structure.

10. The laser apparatus as in claim 1 further comprising a first end baffle positioned adjacent a first end of the electrode structure and a second end baffle positioned adjacent a second end of the electrode structure.

11. The laser apparatus as in claim 10 wherein the first and second end baffles comprise an open-celled foam.

12. The laser apparatus as in claim 10 wherein the first and second end baffles are adapted to control a gaseous flow pattern adjacent the first and second electrode structure ends.

13. The laser apparatus as in claim 12 further comprising an optics package disposed at an end of the laser chamber, and wherein the first end baffle is adapted to prevent the gaseous flow pattern from washing over the optics package.

14. The laser apparatus as in claim 1 wherein the elongate baffle is further adapted for attenuating acoustic waves.

15. A laser apparatus, comprising:
   a casing defining a laser chamber cavity;
   an electrode structure disposed within the laser chamber cavity, the electrode structure having first and second ends disposed adjacent corresponding first and second laser chamber ends;
   a gas circulation mechanism for circulating a gas within the laser chamber cavity; and
   a baffle system comprising an open-celled foam disposed in the laser chamber cavity, the baffle system adapted for directing the gas towards the electrode structure and for providing a non-turbulent gas flow around the electrode structure first and second ends.

16. The laser apparatus as in claim 15 wherein the baffle system comprises an elongate primary baffle positioned generally parallel to the electrode structure.

17. The laser apparatus as in claim 15 wherein the baffle system comprises a first end baffle positioned adjacent the first electrode structure end and a second end baffle positioned adjacent the second electrode structure end.

18. The laser apparatus as in claim 15 wherein the baffle system is further adapted to arrest a plurality of particles generated within the laser chamber cavity.

19. The laser apparatus as in claim 15 further comprising an optics package disposed at the first laser chamber end, and wherein the baffle system is adapted to prevent the circulating gas from washing over the optics package.

20. The laser apparatus as in claim 15 wherein the open-celled foam comprises an open-celled metal foam.

21. The laser apparatus as in claim 15 wherein the baffle system fills greater than about one percent (1%) of the laser chamber cavity.

22. The laser apparatus as in claim 15 wherein the baffle system is adapted to attenuate at least a portion of the acoustic energy within the laser chamber cavity during operation of the laser apparatus.

23. A method of filtering particulates from a gas in a laser apparatus, the method comprising:
providing a laser apparatus comprising a chamber, an electrode structure disposed in the chamber, and a gas circulation system;
inserting a baffle system into the laser chamber, the baffle system comprising an open-celled foam; and
engaging the gas circulation system to circulate the gas within the laser chamber, the gas having a plurality of particles disposed therein;
wherein at least some of the particles are arrested by the baffle system.

24. The method as in claim 23 wherein the baffle system comprises an open-celled metal foam.

25. The method as in claim 23 wherein the laser apparatus further comprises an optics package, and the baffle system is further adapted and positioned to prevent the circulating gas from washing over the optics package.

26. The method as in claim 23 wherein the baffle system comprises first and second end baffles disposed adjacent first and second ends of the electrode structure, respectively, and wherein the first and second end baffles operate to smooth a gas flow pattern at the first and second electrode structure ends.

27. An excimer laser comprising:
a laser chamber;
a lasing gas disposed within the chamber;
a pair of lasing electrodes within the chamber; and
an open celled metallic foam disposed in the laser chamber so as to collect particles generated in the chamber during firing of the laser.

28. The excimer laser as in claim 27 wherein lasing of the gas between the electrodes during firing of the laser generates a photoablative laser beam suitable for removal of corneal tissue so as to correct refraction.

29. The excimer laser as in claim 27 wherein lasing of the gas between the electrodes during firing of the laser generates a pulsed laser having a wavelength of about 193 nm.

30. The laser apparatus as in claim 1 wherein the elongate baffle fills between about one percent (1%) and about sixty percent (60%) of the laser chamber.

31. The laser apparatus as in claim 1 wherein the elongate baffle fills between about one percent (1%) and about ninety percent (90%) of the laser chamber.

32. The laser apparatus as in claim 15 wherein the open-celled foam comprises a plurality of openings having an irregular size and shape.

* * * * *